(12) United States Patent
Chambers et al.

(10) Patent No.: US 7,688,675 B2
(45) Date of Patent: Mar. 30, 2010

(54) UNDERWATER BIOMASS ASSESSMENT DEVICE AND METHOD

(75) Inventors: James P. Chambers, Oxford, MS (US); Henry E. Bass, Oxford, MS (US); Kenneth E. Gilbert, Thaxton, MS (US); Daniel E. Kleinert, Jr., Oxford, MS (US)

(73) Assignee: University of Mississippi, University, MS (US)

( * ) Notice: Subject to any disclaimer, the term of this patent is extended or adjusted under 35 U.S.C. 154(b) by 0 days.

(21) Appl. No.: 11/691,481

(22) Filed: Mar. 26, 2007

(65) Prior Publication Data

US 2008/0068926 A1 Mar. 20, 2008

Related U.S. Application Data

(60) Provisional application No. 60/785,571, filed on Mar. 24, 2006.

(51) Int. Cl.
*G01S 15/88* (2006.01)
*G01S 15/96* (2006.01)

(52) U.S. Cl. .................................................. 367/88

(58) Field of Classification Search ................ 367/107, 367/98, 97, 88, 11, 7
See application file for complete search history.

(56) References Cited

U.S. PATENT DOCUMENTS 4,347,591 A * 8/1982 Stembridge et al. ......... 367/104
4,949,318 A * 8/1990 Patrick et al. ................. 367/87
5,260,912 A * 11/1993 Latham ........................ 367/88
6,097,670 A * 8/2000 Johnson ....................... 367/120
2005/0270905 A1 * 12/2005 Patterson et al. .............. 367/88
2008/0068926 A1 * 3/2008 Chambers et al. ............. 367/87

OTHER PUBLICATIONS

Chambers, James P., C. Douglas Minchew and Rachel V. Beecham, "Biomass assessment in commercial catfish ponds", Proc. of the 149th meeting of the Acoustical Society of America (Apr. 2005), Vancouver, BC.
Chambers, J.P., Kleinert, D., Carpenter, B., Heffington, J., Minchew, C.D. and Beecham, R.V. "AquaScanner Catfish Sonar" Catfish Farmers of America Meeting, Greenville, MS 2005.
Chambers, J.P., Kleinert, D., Carpenter, B., Heffington, J., Minchew, C.D. and Beecham, R.V., AquaScanner Catfish Sonar: Acoustic Instrumentation for Aquaculture. Mississippi Intellectual Property Forum, Jackson, MS Dec. 2004.
Heffington, J.D. and James Chambers, "Design and Construction of a Sonar Transducer," ASME Regional Student Conference, Miami, FL, Apr., 2003. Regional Meeting.

(Continued)

*Primary Examiner*—Dan Pihulic
(74) *Attorney, Agent, or Firm*—Stites & Harbison PLLC; Richard S. Myers, Jr.

(57) ABSTRACT

A system for assessing underwater biomass that comprises a frame that can float and hold the system on a body of water; a transducer that emits and receives wave signals; a motor box, that positions the transducer below a water line; a control unit to allow a user to operate the system and view results obtained from the system; an electronics housing that receives a CPU board that communicates with and relays information to and from, the control unit; and a communication device to facilitate communication between the control unit and the CPU board.

20 Claims, 9 Drawing Sheets

OTHER PUBLICATIONS

Chambers, James P., Daniel G. Wren, Brian Carpenter, C. Douglas Minchew and Rachel V. Beecham, "The development and use of a high frequency horizontal sonar to monitor channel catfish in shallow water commercial aquaculture ponds ", Proc. of the 144th meeting of the Acoustical Society of America (Dec. 2002), Cancun, MX.

Chambers, James P., C. Douglas Minchew, Rachel V. Beecham, Robert S. Luttrel, Daniel E. Kleinert, Jr., and Daniel G. Wren, "The use of a high frequency horizontal sonar to monitor channel catfish in shallow water commercial aquaculture ponds," to be presented at the Ices Symposium on Acoustics in Fisheries and Aquatic Ecology, Jun. 10-14, 2002, Montpellier, France.

Williams, S., R. Luttrel, J. Chambers, "Design of a Motion Control Board for Monitoring Catfish in Commercial Aquaculture Applications," ASME Regional Student Conference, Jackson, MS Apr. 2002.

Chambers, James P., C. Douglas Minchew, Rachel V. Beecham, Robert S. Luttrel, Daniel E. Kleinert, Jr., and Daniel G. Wren, "The development and use of a high frequency horizontal sonar to monitor channel catfish in shallow water commercial aquaculture ponds", Proc. of the Bouyoucos Conference on Agroacoustics, Oxford, MS May 2002.

Derrow, Robert W. II, Kenneth E. Gilbert, Craig S. Tucker and James Steeby, "A Narrow-Beam, Side-Looking Sonar for Observing and Counting Fish in Shallow aquaculture Ponds".

Hargreaves, John A. and Craig S. Tucker, Defining Loading Limits of Static Ponds for Catfish Aquaculture, Aquaculture Engineering; 28; 2003; pp. 47-63.

Mcgee, Mike and Andrew Lazur, "Alternative Opportunities for Small Farms: Catfish Production Review", University of Florida, Sep. 1998.

Wellborn, Thomas L. and Martin W. Brunson, "Construction of Levee-type Ponds for Fish Production", Southern Regional Aquaculture Center, SRAC Publication No. 101.

Chambers, James, Daniel Wren, Brian Carpenter, "The development and use of a high frequency horizontal sonar to monitor channel catfish in shallow water commercial aquaculture ponds," Acoustical Society of America, Pan-American/Iberian Meeting on Acoustics, vol. 112, No. 5, Pt. 2, Nov. 2002, p. 2432.

Coln, Patrick D., John D. Heffington, James D. Bell, and James P. Chambers, "Temperature Gradient Measurement in a Shallow Water Environment," Mississippi Academy of Sciences Meeting (Feb. 2006), Vicksburg, MS.

Heffington, John D., James P. Chambers, David Heikes, Steve Pommerleau, and Eric Stone, "Using Acoustic Backscatter to determine the size distribution of channel catfish in a commercial pond," Proc. of the 3rd Joint Meeting of the ASA and ASJ. 120(5), Pt. 2, p. 3106 (2006).

* cited by examiner

UNDERWATER BIOMASS ASSESSMENT DEVICE AND METHOD

PRIORITY INFORMATION

This application claims priority to U.S. Application Ser. No. 60/785,571, filed Mar. 24, 2006, the contents of which are incorporated herein by reference.

GOVERNMENT SUPPORT CLAUSE

This invention was made with support from grant number 58-6402-4-094 from the USDA-ARS. The government has rights to this invention.

FIELD OF THE INVENTION

The present invention relates to the field of underwater biomass assessment and, more specifically, embodiments of the present invention include devices and methods for determining fish populations, including fish populations in shallow water environments.

BACKGROUND OF THE INVENTION

With increasing consumer demand, freshwater and saltwater based aquaculture is poised to become a major industry in the United States in the 21st century. In the state of Mississippi, channel catfish farming represents an approximate $260 million industry with strong growth potential.

At the present time, a system to inventory in-situ is not available.

An accurate inventory of ponds to determine biomass is desirable in order to increase production efficiencies. For example, the major portion of costs associated with raising channel catfish are related to the cost of feed and aeration which are directly related to the total number of fish being raised in each pond. An accurate inventory can optimize food and aeration expenditures. Inventories can provide farmers with information utilized for seasonal restocking. Additionally, this information can help provide collateral information as crop insurance and bank loans are contingent upon accurate population estimates. The present invention employs side-scan sonar. Side-scan sonar is a category of sonar system that is commonly used to efficiently create an image of large areas of the sea floor. Thus, this sonar system is frequently used for mapping the seabed for a wide variety of purposes, including creation of nautical charts and detection and identification of underwater objects and bathymetric features. It may be used to conduct surveys for maritime archaeology; in conjunction with seafloor samples it is able to provide an understanding of the differences in material and texture type of the seabed. Side scan sonar imagery is also a commonly used tool to detect debris items and other obstructions on the seafloor that may be hazardous to shipping or to seafloor installations by the oil and gas industry. In addition, the status of pipelines and cables on the seafloor can be investigated using side scan sonar. Side scan data is frequently acquired with bathymetric soundings and sub-bottom data which provides a glimpse of the shallow structure of the seabed. Side scan sonar is also used for fisheries research, dredging operations and environmental studies. It also has military applications including mine detection.

Side scan uses a sonar device that emits fan-shaped pulses down toward the seafloor across a wide angle perpendicular to the path of the sensor through the water, which is typically towed from a surface vessel or submarine, or mounted on the ship's hull. The intensity of the acoustic reflections from the seafloor of this fan-shaped beam is recorded in a series of cross-track slices, which when stitched together along the direction of motion, become an image of the sea bottom within the swath (coverage width) of the beam. The sound frequencies used in side-scan sonar can range from about 100 kHz to about 2.4 MHz and higher. In many conditions, the higher frequencies yield better resolution but less range.

The use of sonar and side scan sonar in some bodies of water, such as commercial catfish ponds, may pose problems with determining the pond's biomass. For example, the side walls can provide erroneous signals or mask fish signals. Additionally, the water is typically very murky, which also contributes to difficulty in reading sonar images. Further contributing to sonar difficulties are the typical soft, silty gaseous pond bottom.

One example of a system for identifying a target in a liquid medium is US Patent Application Publication Number 2005/0270905, incorporated herein by reference, which discloses a use of a side scan sonar. However, this system does not address or solve problems associated with the shallow water environments where the present invention is effective—a catfish pond, for example. Additionally this application fails to address the portability concerns addressed herein.

Thus, there is a substantial need for the present invention.

SUMMARY OF THE PRESENT INVENTION

One aspect of the present invention is a system for identifying and quantifying underwater biomass.

One aspect of the present invention is a high frequency, horizontally scanning, active pulse echo sonar system to estimate pond populations. Commercial catfish ponds are typically 2 to 10 acres and, unlike many offshore fisheries, have fairly shallow depths of 1 to 2 m. The system components and its use are described herein along with results from field tests. The present invention is suitable for catfish ponds of all sizes.

One embodiment of the present invention is a system for assessing underwater biomass that comprises a floating frame, a transducer engaged with the frame that generates an underwater, side scan sonar wave, an echo detector for collecting the sonar wave, and a processor to separate, analyze, and process a region of interest from the sonar image, to extract information such as biomass.

Another embodiment of the present invention is a method of assessing the underwater biomass comprising placing a system of the present invention in a liquid medium, emitting a side scan sonar wave, collecting and reading the raw wave, transforming the raw wave into a processed data image, analyzing the processed data image to determine the biomass in the liquid medium.

Another embodiment of the present invention is a sonar system that comprises an electronic device that comprises both off the shelf components and uniquely designed components to transmit, collect and analyze acoustic data in a commercial catfish pond. The unit of this embodiment is designed and constructed around the PC-104 form factor. The electric device of this embodiment can be encased in a water resistant Parvus extruded aluminum case, with the case resting upon a floating frame.

Of course, it is understood that additional aspects/embodiments, and advantages of the present invention will be realized based on a review of the specification, drawings, and appended claims. Additionally, all aspects/embodiments are presented for exemplary and explanatory purposes. They should not be construed as limiting of the present invention.

One aspect of the present invention is that embodiments herein use relative signal levels. Many sonar systems use the absolute levels and go to great lengths to correct echo levels for variations from orientation, calibration etc. Many of the liquid medium environments that the present invention may be used in situations where the signal levels can change. In embodiments of the present invention, a narrow (about 2 degree for example) beam width is used, the return echoes can vary substantially if the transducer is slightly misaligned or moves. For example, if the target is more than 2 degrees off axis, the return signal will be 3 dB down, and the more off axis, the greater the reduction.

It is common that fisheries abundance estimates take the echo level amplitudes and apply them to a model that correlates echo to biomass. This implicitly links amplitude to biomass. Accordingly, if the hardware is skewed (or misaligned), the numbers will not be as accurate. In the past, signal levels have had to be corrected to account for beam motion (due to boat motion) or use a fixed sonar platform like a tripod. In contrast, the present invention is a mobile, easy to use platform that can rapidly measure biomass in many types of aquaculture farms.

One aspect of the present invention is a biomass assessment device that comprises a mobile, pontoon-like platform. Embodiments of this system can be rapidly deployed using a two person team. In those embodiments, the transducer hangs below the system and is oriented with a gimble to reduce motion. Multiple signals are sent in a single direction and the data is averaged. The present inventors discovered that using the relative amplitudes allows for flexibility.

DESCRIPTION OF THE INVENTION

The application of the present invention will allow for much needed accurate underwater stock assessment, which as stated above has many advantages.

Figure 1:
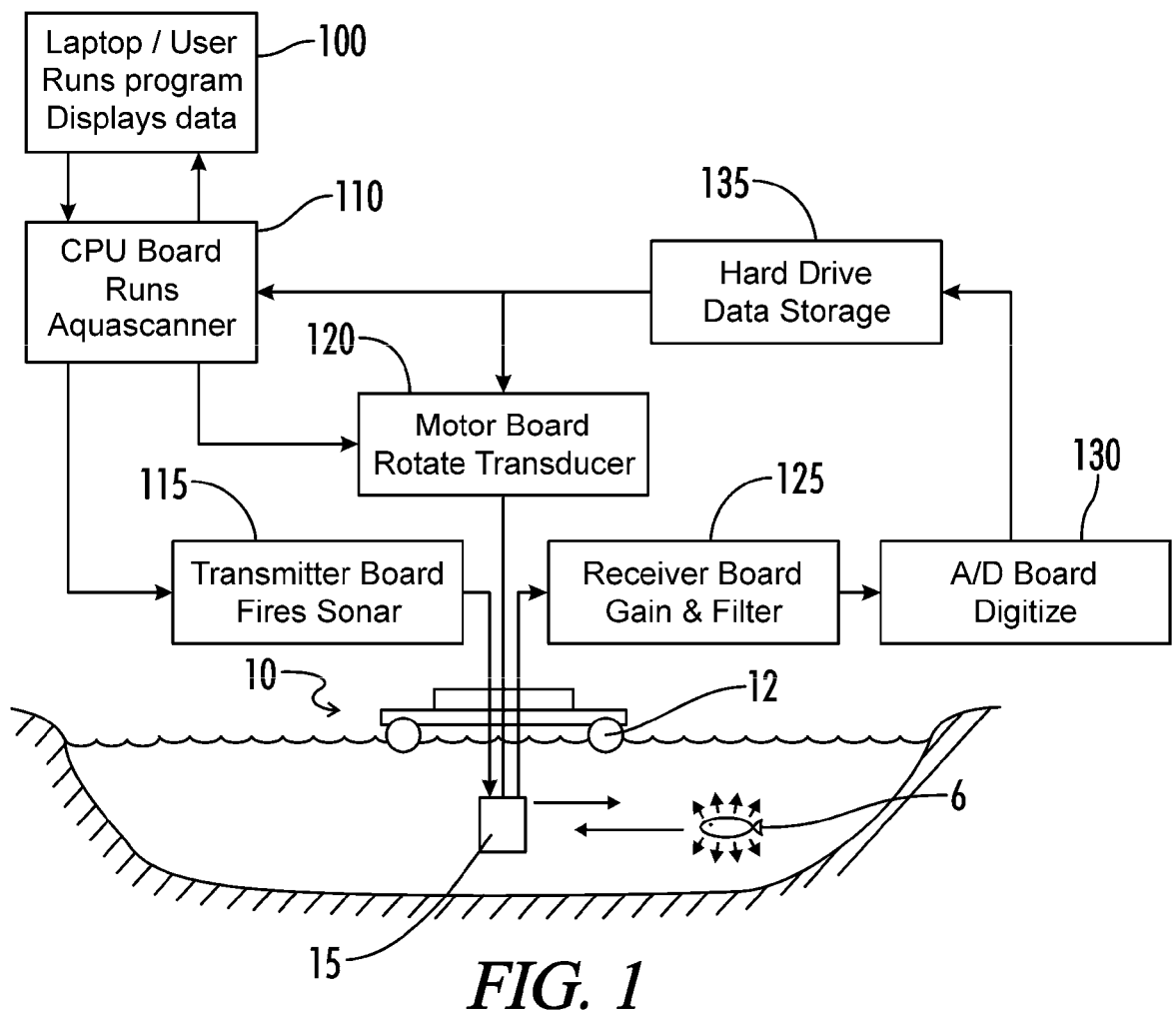
FIG. 1 is a modified block diagram showing the operation of an embodiment of the present invention.

As stated above, FIG. 1 is a modified block diagram showing the operation of an embodiment of the present invention. Generally speaking, an embodiment of a system 10 of the present invention comprises a frame 12 that floats on the water surface and, a transducer 15 that engages the frame while being suspended under the surface of the water. The transducer emits a side scan sonar signal that is reflected off a fish 6 or other underwater object. The reflected signal is received by an echo detector and processed to determine the biomass of the underwater environment. In FIG. 1, a user with a computer, such as a laptop, for example, can operate and control the system, as shown in block 100. A wireless Ethernet can assist with the communication between the equipment on the frame and the computer being used by the operator. A CPU board, block 110 runs the system. The CPU board controls the transmitter board, which fires the sonar (block 115), and the motor board, which rotates and controls the transducer (block 120). Once the transducer fires the sonar and the signal is received, the receiver board (block 125), filters the signal, and the A/D board digitizes the signal (block 130). A hard drive can be used for data storage (block 135).

Figure 2A:
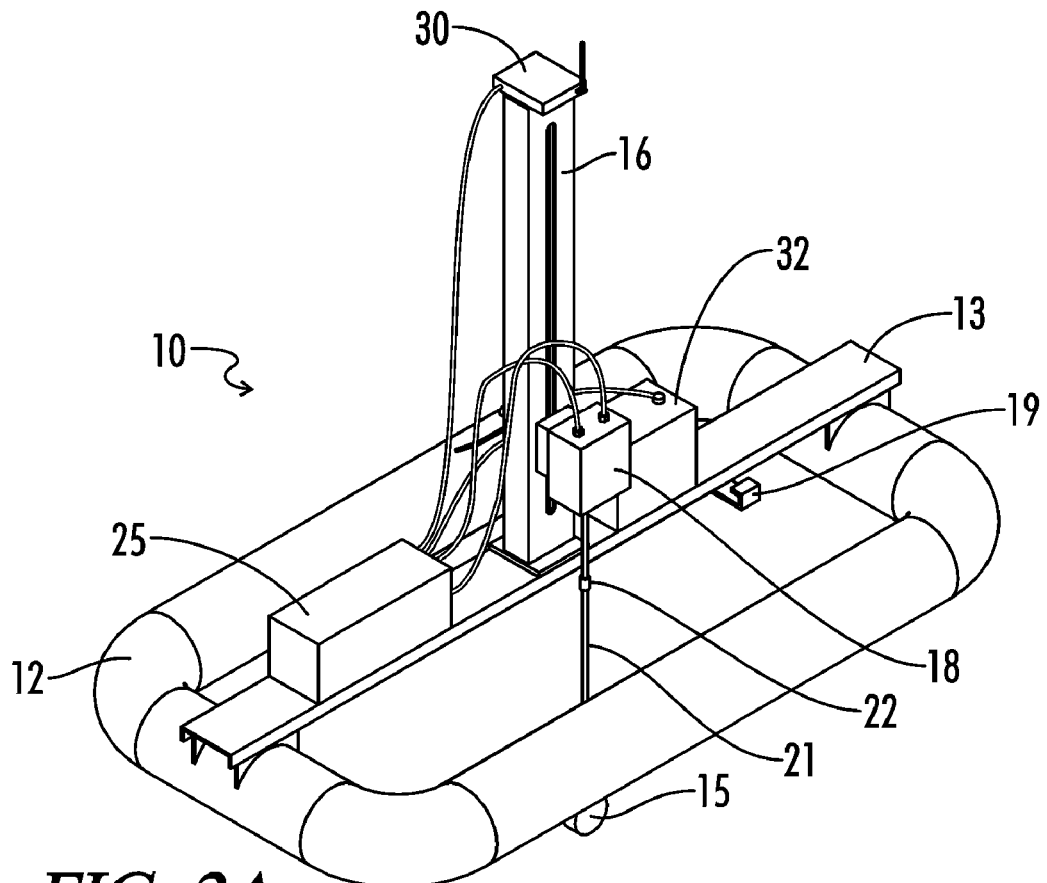
FIG. 2A is a perspective view of a device of the present invention.
Figure 2B:
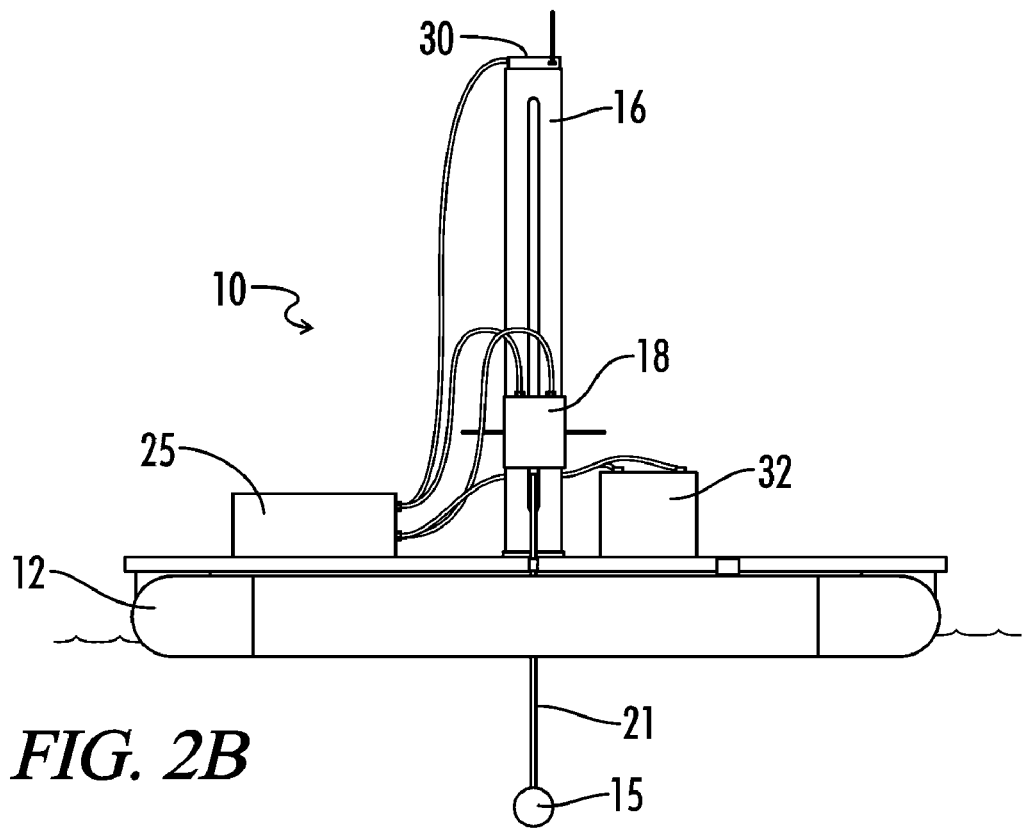
FIG. 2B is a side view of a device of the present invention.

FIG. 2A shows a perspective view of a device 10 of the present invention. FIG. 2B is a side view of a device of the present invention floating on water. As is immediately apparent from the drawings, the present invention is portable. The frame 12 allows the device to float on a body of water. In embodiments of the present invention, the frame is constructed from standard PVC pipe. The PVC pipe may comprise a buoyancy device either attached to or within the pipe, so that the pipe can support the device in the water. The buoyancy device can be a foam applied within the pipes, inflatable bags, etc.

Across the frame is a component support 13. In the embodiment pictured, the component support 13 holds a transducer column 16. The support column shown also holds the transducer arm motor box 18.

In the embodiment shown, a wireless communication unit 30 that allows communication with a user's computer is mounted on the column. In other embodiments, the communication may be simply wired to the user's computer. However, for ease of use and increased portability, embodiments with a wireless connection, such as a wireless Ethernet connection are in many instance preferred.

Figure 3:
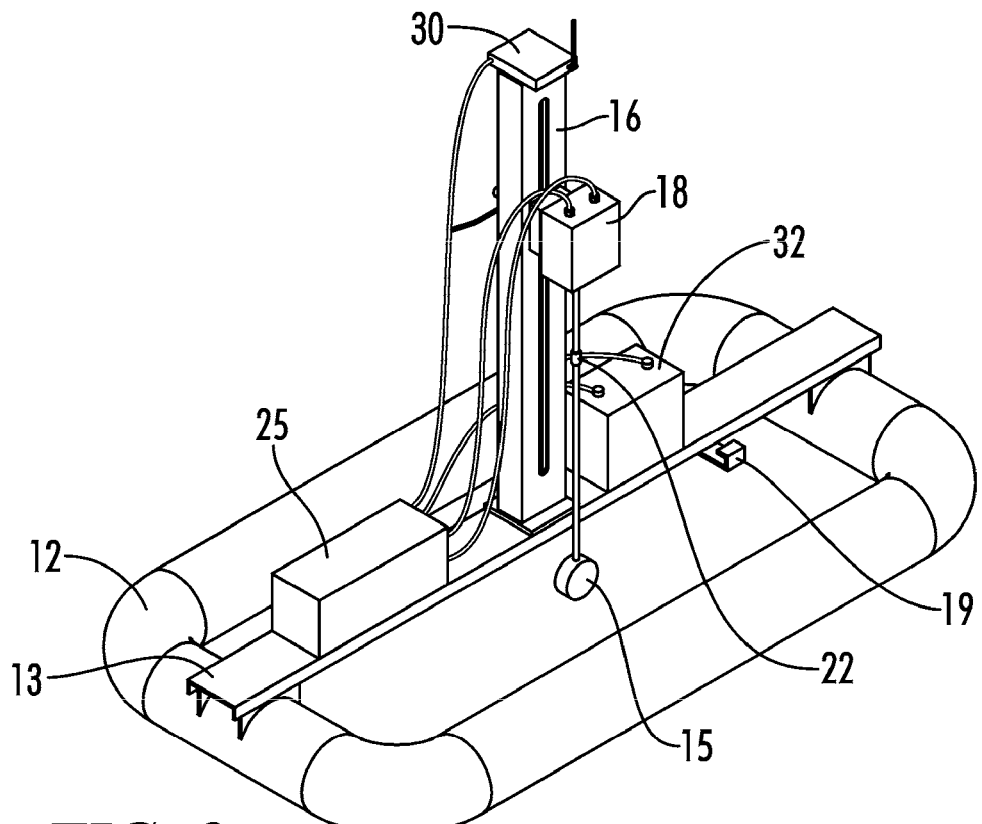
FIGS. 3 and 4 are perspective views of embodiments of the device of the present invention.

In the embodiments shown, the column 16 can also comprise a mechanism whereby the depth of the transducer and transducer shaft 21 can be adjusted and held along the length of the column 16. This feature is shown in FIG. 3, where the motor box 18 is at a different position on the column, allowing the transducer to be used at a more shallow depth.

In the embodiments shown in the Figures, the support 13 also holds an electronics housing 25. The contents of which are further described below.

Also shown as part of the system of FIG. 2 is a power source 32. In the embodiment shown, the power source is a battery.

Finally, the support 13 can comprise a transducer shaft cradle 19 to hold the transducer when it is not extending below the frame.

Figure 4:
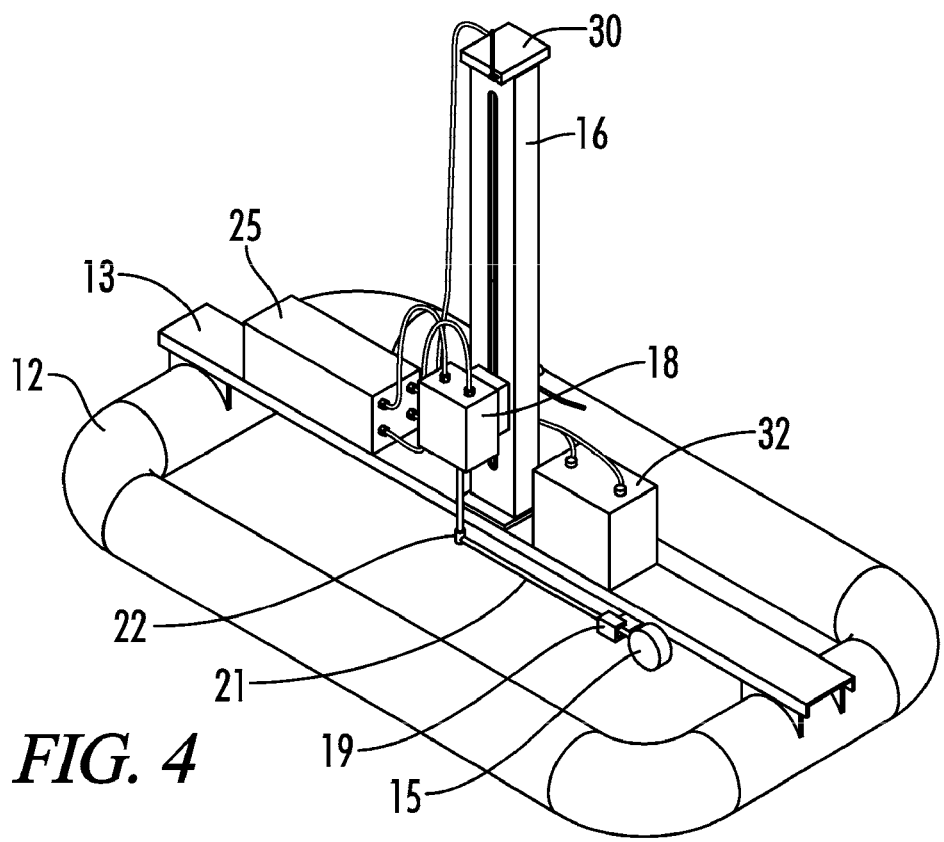

FIG. 4 is a perspective view of the same embodiment as shown in FIGS. 2A and 2B. However, this view shows the cradle 19 receiving and holding the transducer shaft. This feature allows the frame to rest on the ground when not in use on a water surface or in the bed of a truck when moving from pond to pond.

Figure 5:
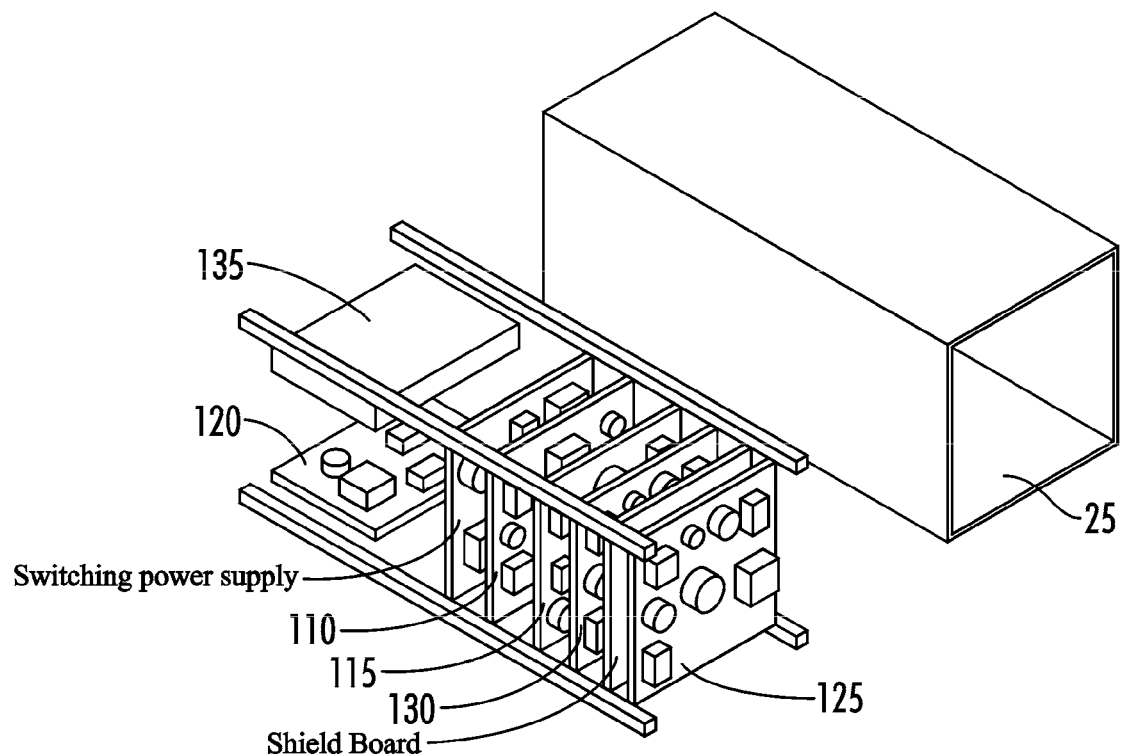
FIG. 5 shows an example of some electronic components used with a system of the present invention.

FIG. 5 shows a perspective view of an option for electronics that may be used in connection with embodiments of the present invention. These electronics may be housed in the electronics housing 25.

In embodiments of the present invention, the system can be controlled by a central processing unit (CPU). In FIG. 5, this component is a MOPS 686+ in the PC 104 form factor with a Pentium chip operating at 166 MHz. The CPU controls the operation of the other sub components (transmitter, Analog to digital card (A/D) etc.) It can utilize Suse 6.3 Linux code as the operating system. It communicates with a host computer, in embodiments, a laptop, via wireless Ethernet.

The acoustic signals are typically generated by a transmitter board. In embodiments of the present invention, the transmitter board is a high power (about 7200 W) tunable gated amplifier. It can generate arbitrary length pulses at the desired frequency. Embodiments of the present invention use a frequency of about 460 kHz. This element of the present invention was designed in the PC-104 format to operate under microprocessor control which allows it to be fired in time with the data acquisition. It generates electronic signals of about 2 kV peak to peak amplitude.

The transmitted acoustic signals are sent to transducers which both transmit and receive the acoustic signals in the water. Examples of transducers of the present invention include a piezoelectric disk with a diameter of about 4" and a resonant frequency of about 460 kHz. They can be encased in epoxy to impedance match them to water. They have a beam width of about 2 degrees. This is generally considered to be high frequency (and narrow beamwidth), preferred to keep the acoustic energy in the water column (and minimize interactions with the top of the water and sediment bottom). The transducers of the present invention may have a nominal transmitted sensitivity of 188 dB (re 1 micro Pa/V at 1 m) and a nominal received sensitivity of −182 dB (re 1V/micro Pa).

The captured acoustic signals are received in the receiver board. The receiver board acts as a combined amplifier and filter. Examples have about a 110 dB dynamic range utilizing a high gain and low gain side to allow the signals to be digitized on a 60 dB dynamic range A/D card. This dynamic range allows the unit to observe both faint signals (10's of microVolts on the high gain side) from small or distant targets as well as larger signals (Volts on the low gain side) from larger or closer targets. With respect to some embodiments, only 60 dB of dynamic range on the high gain side is used, but in other embodiments, increases in the signal level will require the use of both sides of the receiver board. It was also designed in the PC-104 format to allow precise timing between the fire and acquire portions of the data handling. It operates in an envelope detection mode to allow under sampling of the data (sample rate of about 25-100 kHz) to reduce data storage and scan time. It is tuned to an operating frequency of about 460 kHz.

The analog signal that exits the receiver board is digitized by a commercially available Real Time Devices Inc. DM 6420 data acquisition board (A/D boards). This board can also be in the PC-104 format and is controlled by the CPU board.

The operating system, programs and all data is stored on either a commercially available 2 GB (giga byte) laptop hard drive or 2 GB flash memory drive. Once a scan is completed the data can be transferred to the host laptop for further analysis via Ethernet.

In embodiments of the present invention, there is a shield board between the receiver board and the rest of the system to reduce electronic noise from the other components from impinging on the receiver board which receives weak (micro volt) level signals.

The system can be powered by a TriM Engineering HE104 switching power supply which provides the DC and AC power required by the various other system components. It is powered by a Panasonic deep cycle 12 V DC battery which sits on the pontoon/frame and which can be external to the system electronics.

In embodiments of the present invention, the system is capable of scanning an entire pond by means of taking data circumferentially around the pond from one central location. With approximate 2° beam width transducers, typically 180 data pings are required to scan a pond. The motor board which controls the motor inside the motor box is also microprocessor controlled and interacts with the CPU through the serial port. It is capable of extremely small steps and a typical embodiment is set at 2 degrees to match the beam width of the transducer. The system should be able to perform full 360° scans as well as partial scans of a pond. The motor box may be comprised of components to provide the necessary mechanical and electrical manipulations. The use of a rotating connector allows for the collection of electronic data from a rotating mechanical system without the binding of wires. One example of a rotating connector is available from Mercotac™.

Figure 6:
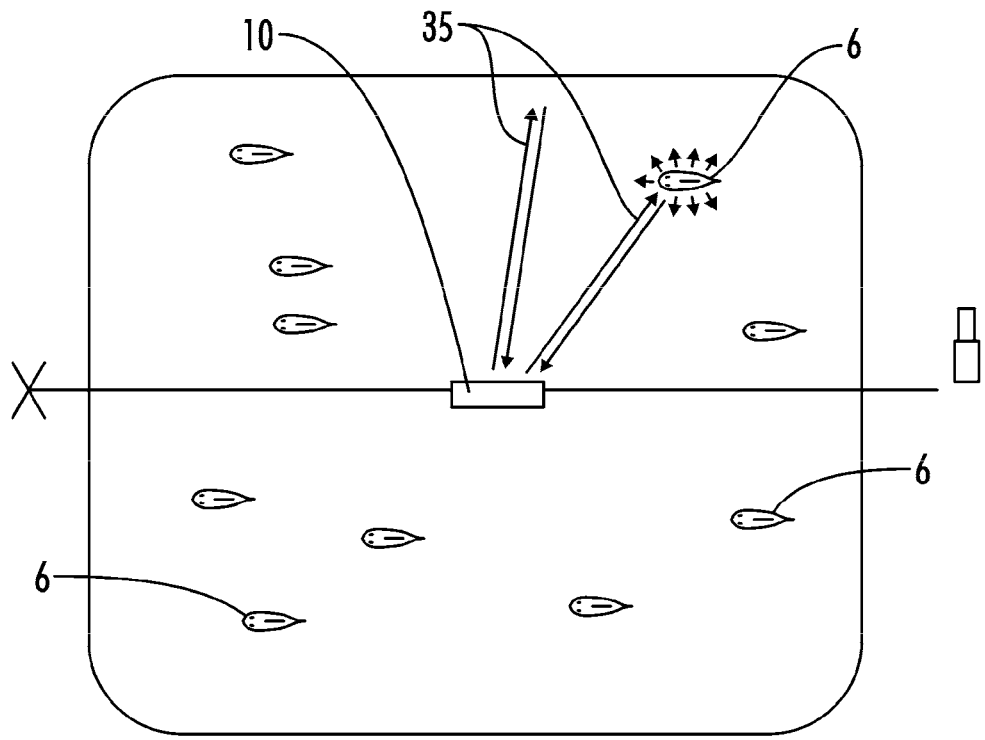
FIG. 6 is a diagram showing an example of a device of the present invention in use.

FIG. 6 shows an example of the system of the present invention in use. Sonar waves 35 are shown.

Embodiments of the present invention can be of various shapes, especially the frames, or sizes. As one example, the nominal dimensions of the system in FIG. 2 is about 40"×72". This allows for the system to be easily transported, such as in the back of a pickup truck. The height of the vertical bar, the support column 16 that holds the motor box is about 36". In this embodiment, the electronics housing 25 is about 5½"× 5½"×16". The motor box 18 is about 5½"×5½"×6" (height). The transducer may be about 5" in diameter and about 1" thick.

When being placed in a pond, or other body of water, the system is moved away from the bank and the transducer arm 21 is moved from the cradle 19, allowing it to be positioned underwater. The gimble 22, an elbow-like structure on the arm helps keep the transducer plum as the sonar bobs and weaves from wind and waves. The arm can be weighted in various ways to keep the transducer in a vertical position. The system can be positioned with a guide wire anchored on the banks of the body of water.

Figure 7:
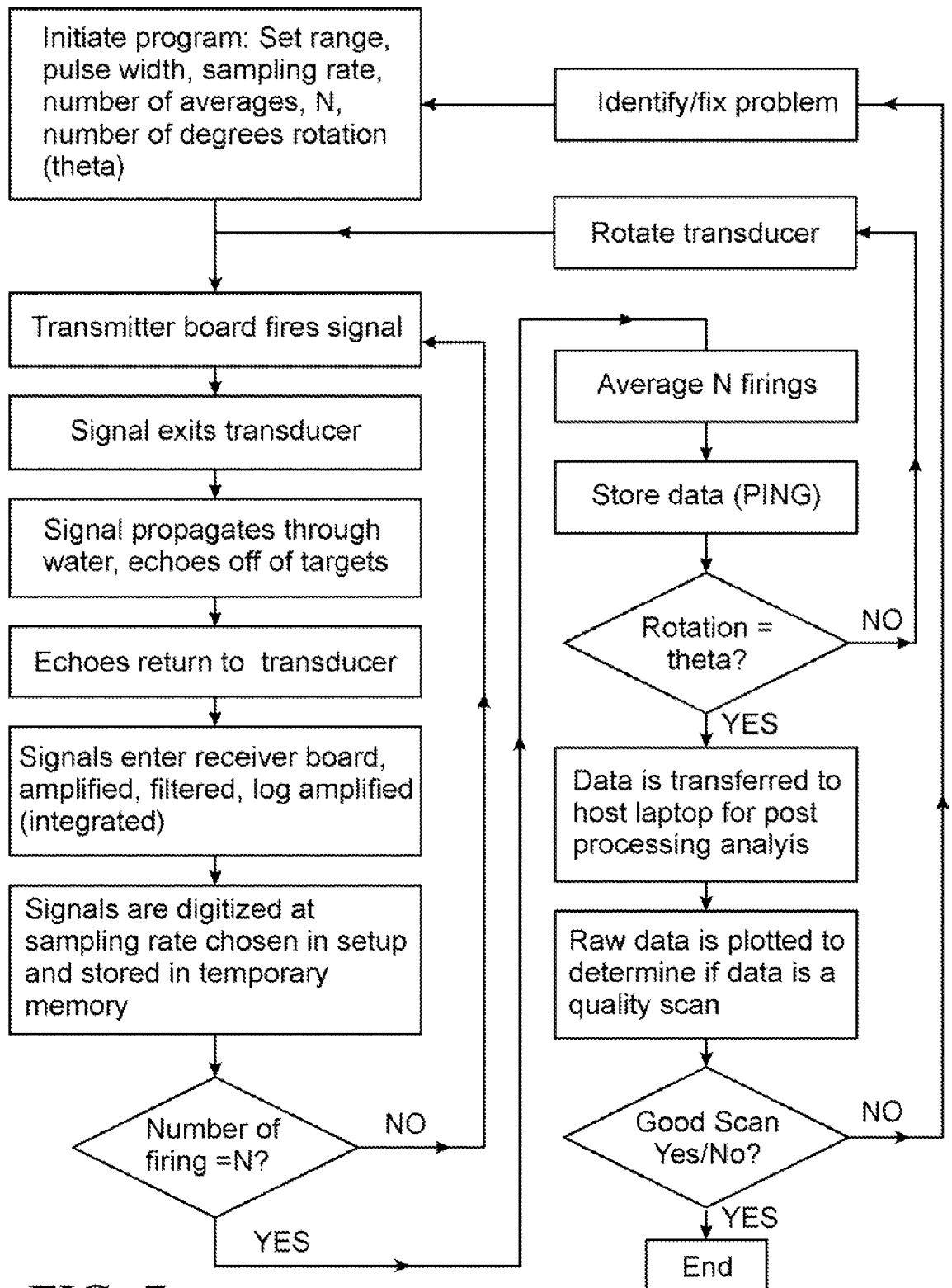
FIG. 7 is a flow diagram that demonstrates a method of the present invention.

The system is shown in another light in FIG. 7, a flow diagram. This diagram shows that, in this example, the program is initiated, which includes setting a range, pulse width, sampling rate, number of averages, and number of degrees. The transmitter board fires a signal, which exits the transducer. The sonar signal propagates through the water, echoing off of targets. The echoes return to the transducer. The signals enter the receiver board, are amplified, filtered, and log amplified (integrated). The signals are then digitized at a sampling rate chosen in the setup and stored in temporary memory. If multiple, N, firings are chosen the signal firing is repeated, or the stored data is transferred to the hard drive for later analysis.

Temporary signals are averaged to reduce noise. The typical averaging is 20, so time of flight in water required for 20 pings at a range of 150 meters is nominally 4 seconds. The averaged signal is stored in hard drive/flash memory storage. The motor board can initiate rotation of the transducer. In certain embodiments, the rotation is 2 degrees. Signal firing/collection is repeated, typically at 180 repetitions for a 360 degree scan of a pond, if a two degree rotation is used.

Figure 8A:
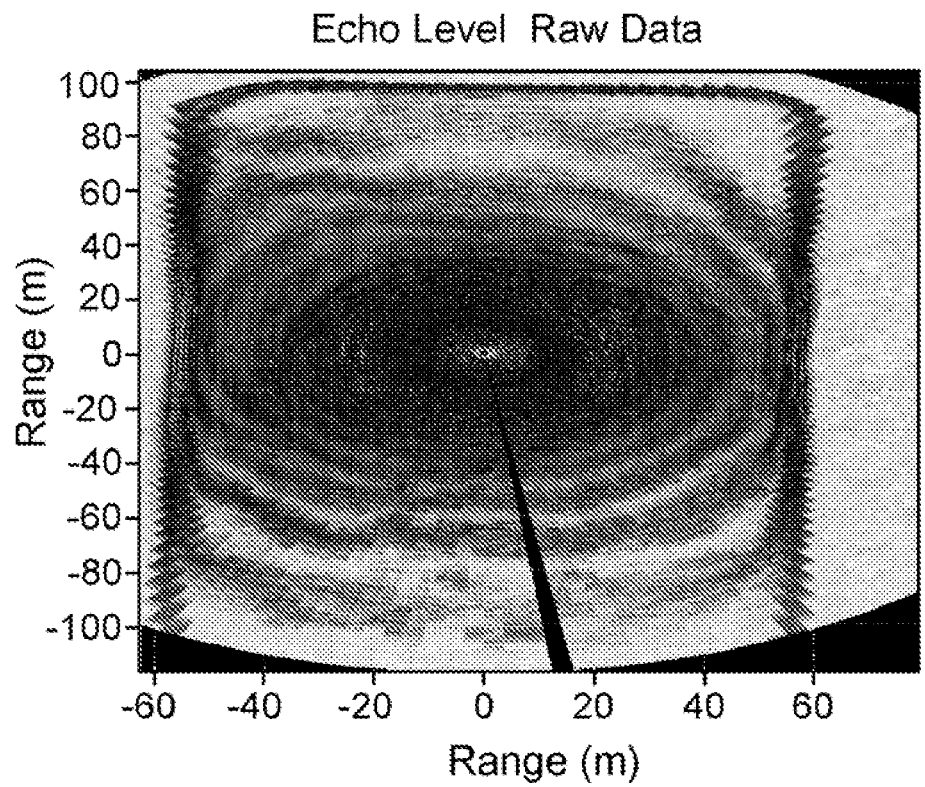
FIGS. 8A-F show examples of imaged raw data vs. imaged processed data
Figure 8B:
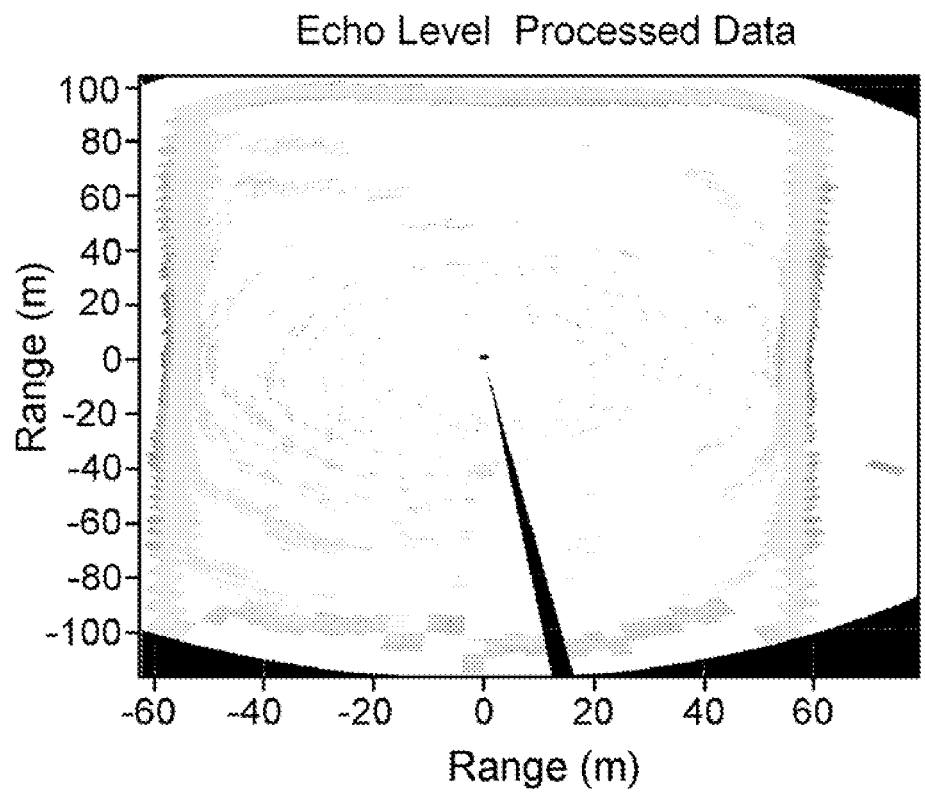
Figure 8C:
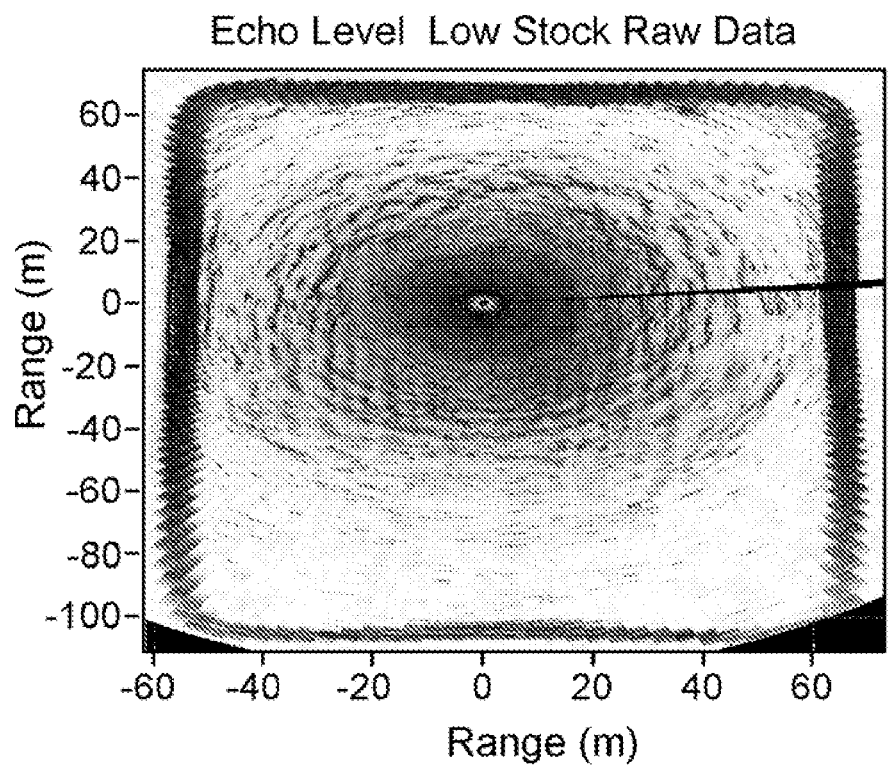
Figure 8D:
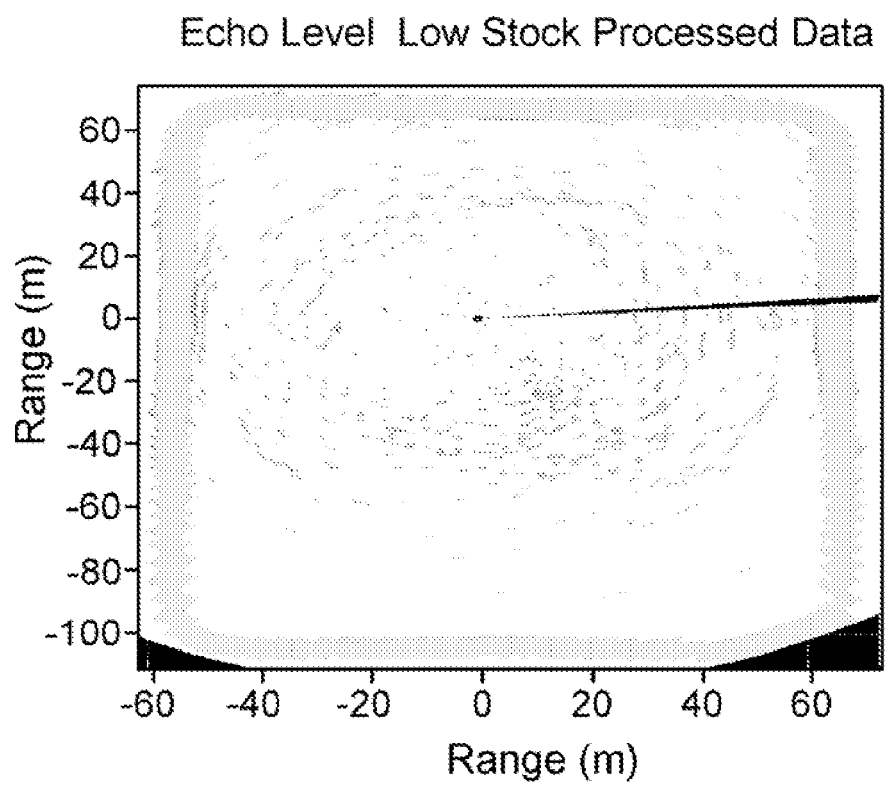
Figure 8E:
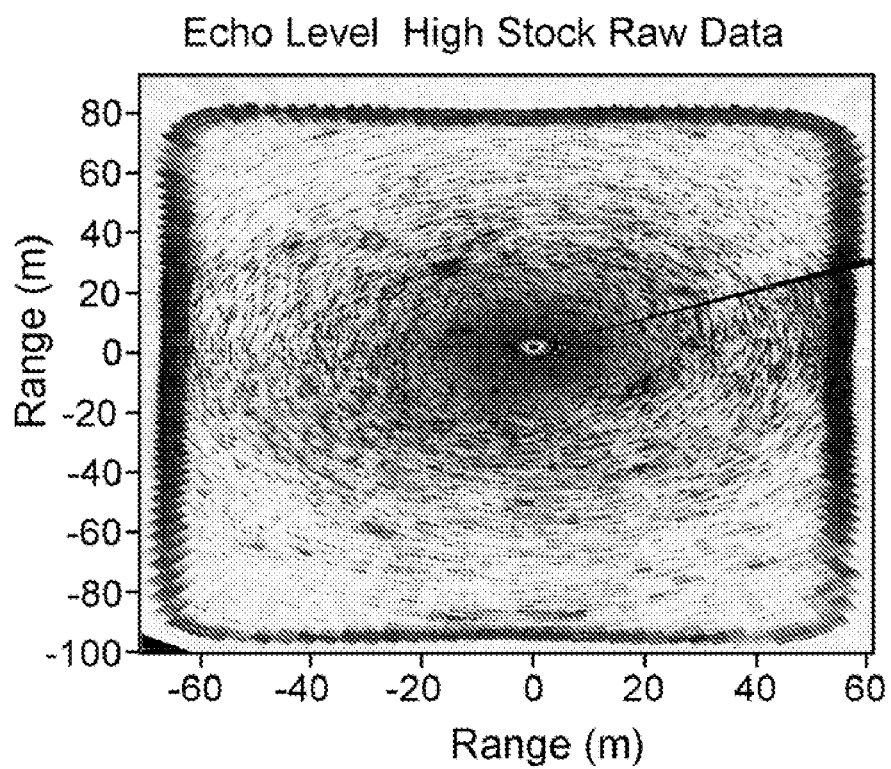
Figure 8F:
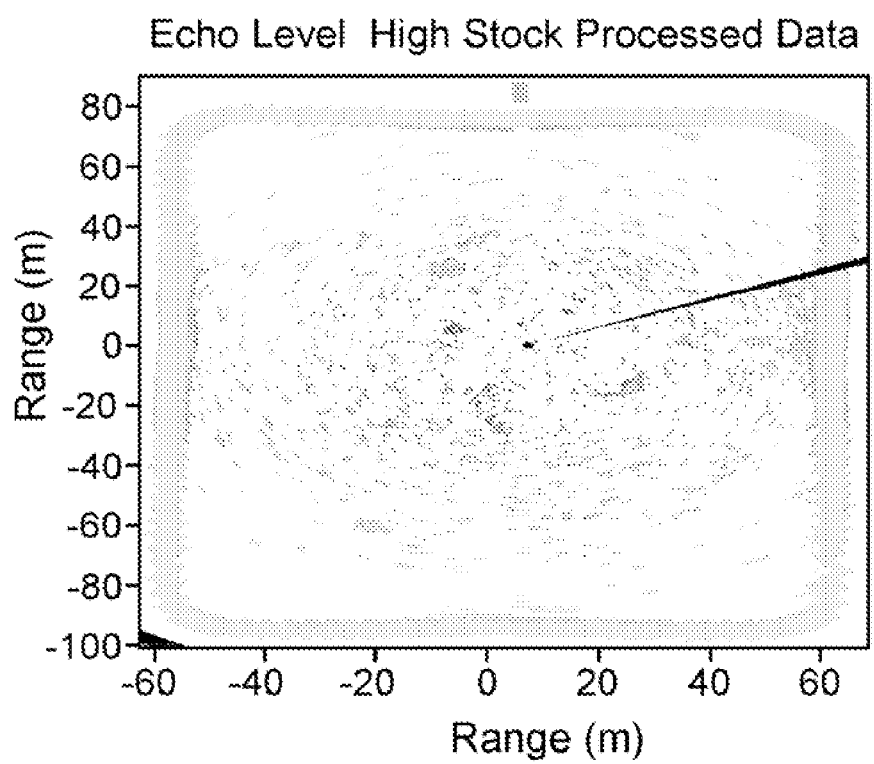

The raw data, examples of which are shown in FIGS. 8A,C,E, is plotted to determine if the scan was a quality scan. If it was not of sufficient quality, the process can be repeated. If the scan was of sufficient quality to be further processed, the sonar transmissions are complete. Signal processing is performed on the raw data to determine biomass, examples of which are shown in FIGS. 8B, D, F. For the examples shown in this Figure, the scans were taken in a catfish pond with nominal stockings of 0 lbs/acre (empty ponds, FIGS. 8A and 8B), about 2000 lbs/acre (low stock ponds, FIGS. 8C and 8D), and about 8000 lbs/acre (high stock ponds, FIGS. 8E and 8F).

A unique feature of the system is the conversion of the acoustic data into expected biomass. Traditional methods of biomass assessment have utilized the amplitude of the captured acoustic echo signal along with an assumed fish orientation and target strength to size equation to predict biomass. Typically, these methods are used for vertical scanning sonar systems and side scan sonar systems in deep water applications (such as open sea pens).

With respect to the present invention, aspects include the use of side scan sonar in a shallow (for example, approximately 1 m deep) environment. In the traditional methods mentioned above, acoustic signals that do not hit fish simply pass out of the field of view, since they are propagating through water.

In embodiments of the present invention, because of the smaller or more shallow ponds used, the signal is constantly exposed to the effects of the surface and more importantly to the bottom which is a gas filled sediment and which varies from pond to pond. These additional elements can provide a continuous return signal back to the transducer along with the echoes from individual and schools of fish. This return from the bottom often persists out 10's of meters and can be seen in many if not all of the data scans presented. The method of the present invention discriminates the fish returns from the returns of the additional elements (such as the gaseous bottom).

One aspect of the present invention employs a signal processing routine to isolate those echoes that are significantly bigger and longer than the surrounding data. That is, it is necessary to identify individual echoes out of the background noise. These echoes should represent individual fish or schools of fish while the background signal should represent interference, or noise from the environment (such as, for example, the gas-filled bottom). It is insufficient to, in certain embodiments, use simple amplitude criteria to identify valid echoes since the acoustic signal decays with distance from the inverse square law. Additionally, it may be insufficient to simply add the expected inverse square law loss back to the raw signal and define an absolute amplitude threshold to quantify valid signals since the feedback from the liquid environment will certainly vary from pond to pond and can certainly also vary as the nature of the liquid environment changes.

Figure 9:
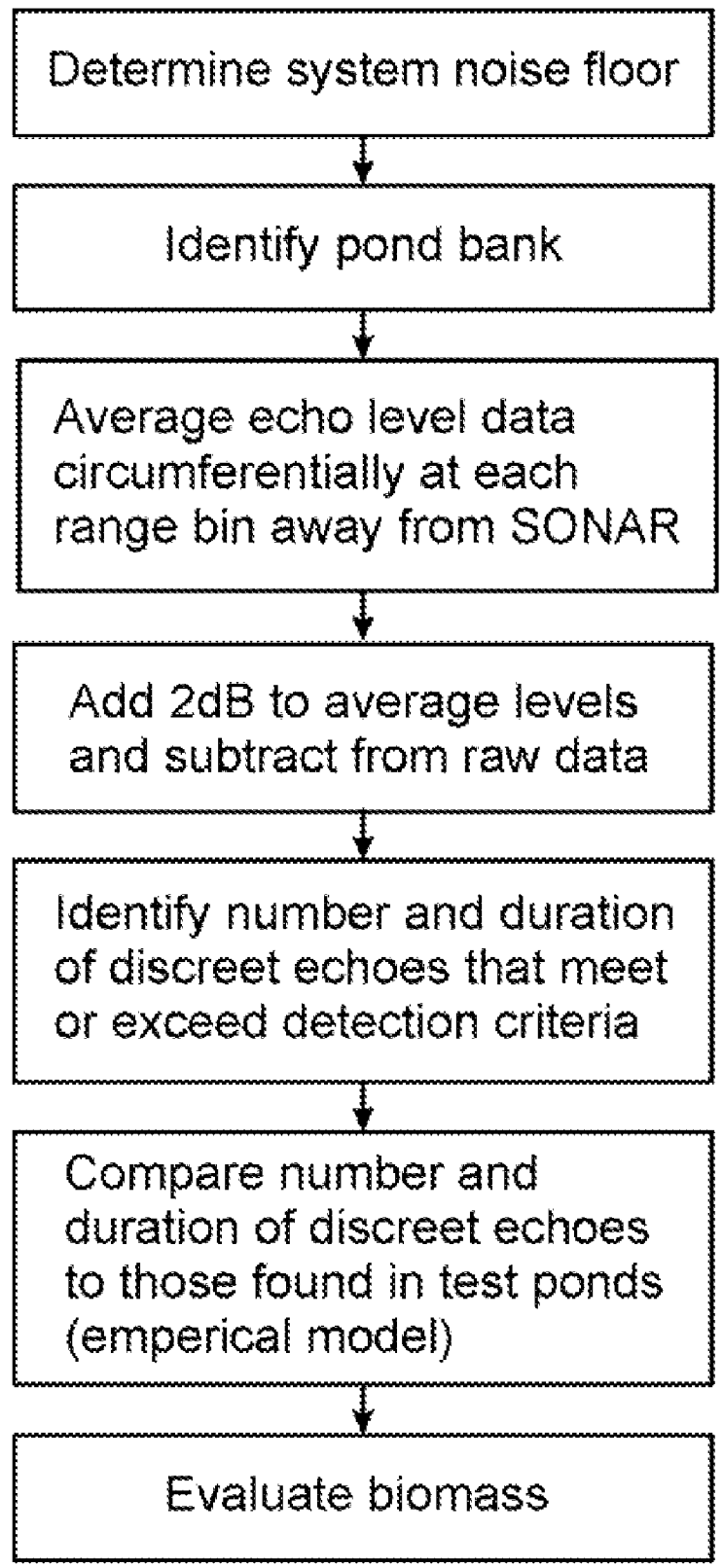
FIG. 9 is a flow diagram that demonstrates a method of the present invention.

FIG. 9 and below address signal processing that is performed with respect to the present invention. The raw data for an entire pond is to be averaged to produce typical range dependent background noise. As stated above, an example of a scan comprises 180 pings of 2 degree rotations. Each of the 180 pings comprise echo level (EL) versus range (up to the range set in the setup) and at a resolution determined by the sampling rate. Each EL at a given range can be referred to as a range bin. The noise floor of the system is defined as the average of the last 5 data points in the first ping. This provides the system noise of the electronics and the pond environment in the event that it has changed and/or is different for each prototype unit or measurement location. The bank of the pond is defined by analyzing each ping backwards in range starting at the furthest range and working in toward the closest range. The first data point that is about 6 decibels (6 dB) larger than the noise floor is defined as the furthest edge of the pond bank. The pond bank is defined to extend about 7 m inward from the furthest edge. While the pond bank itself may not be this wide, using this value eliminates the bank, the shallow incline leading up to the bank and all the grass, foliage etc. from the analysis that can corrupt and skew the measurements.

The raw data within the pond is averaged to determine the general acoustic background clutter which is to be removed from the raw data. At each range bin, all of the data from each of the 180 pings is averaged to determine a mean value. In other words, concentric rings are constructed around the sonar unit at each range step in the collected data and a mean EL value is determined at that range. This procedure is done for each range step up to the bank edge. Only data within the pond (and not in the bank or past it) is used to perform the average. Since the ponds are typically rectangular, the concentric rings will at some point bisect the pond banks.

About 2 dB is added to these mean levels and the averaged levels are subtracted from the raw data, and what is left are discreet echoes which have been separated from the background clutter. For example, FIGS. 8 B,C and D show these discreet echoes.

The discreet echoes are filtered by analyzing their amplitude and duration. A preset amplitude threshold and duration threshold are chosen and the product of the number of pings and their duration is compared to the values obtained from sonar scans on previous ponds with known stocking densities. One aspect of the present invention is the development of an empirical relationship between the number and duration of discreet echoes and pond biomass in ponds with known stocking densities. That is, scans were conducted on a number of ponds with varying stocking densities and the total number of echoes that were greater or equal to a certain size and duration were compared to the biomass densities. The best fit to the biomass data was with the product of echoes and their duration. In other words, there is a linear relationship between the biomass and the total duration of echoes above a certain threshold amplitude. In even more layman's terms, greater pond stocking results in a greater number of echoes and longer echoes. The range requirement comes into play in that only acoustic data up to a limiting 35-50 m was used to correlate with the pond biomass (per acre). These ranges represent approximately 1-2 acres for a circular geometry and make the implicit assumption that the fish are uniformly distributed in the pond since the biomass figures used represent the entire pond. Using the current threshold amplitude and duration settings to a range of 35 m provided a linear fit between biomass and total echo duration with a correlation coefficient of 0.93 in the original test ponds.

The invention thus being described in the Specification and Attachments, it will be apparent to those skilled in the art that various modifications and variations can be made in the present invention without departing from the scope or spirit of the invention.

Other embodiments of the invention will be apparent to those skilled in the art from consideration of the specification and practice of the invention disclosed herein. Particularly, it should be obvious that the embodiments described in the photographs, drawings, and attachments can be modified without departing from the spirit of the present invention.

Unless otherwise indicated, all numbers expressing quantities, specifically amounts set forth when describing experimental testing, are to be understood as being modified in all instances by the term "about." Accordingly, unless indicated to the contrary, the numerical parameters set forth in the Specification and Claims are approximations that may vary depending upon the desired properties sought to be determined by the present invention.

Throughout this disclosure, various publications are referenced. All references cited herein are expressly incorporated herein by reference in their entirety and are considered to be part of this disclosure. Of course, all attachments submitted with the Specification are incorporated herein by reference in their entirety and are intended to be considered part of the present patent application.

We claim:

1. A system for assessing underwater biomass, comprising:
   a frame that can float and hold the system on a body of water;

a transducer that emits and receives side scan sonar signals;

a motor box, that positions the transducer below a water line;

a control unit to allow a user to operate the system, process data, and view results, said data processing including the averaging of multiple acoustic reflections to determine acoustic background noise that is to be removed from the raw data during further processing;

an electronics housing that contains a CPU board that communicates with and relays information to and from, the control unit;

a communication device to facilitate communication between the control unit and the CPU board.

2. The system of claim 1, wherein the frame comprises PVC pipe arranged in a pontoon-type arrangement.

3. The system of claim 1, wherein the frame comprises a buoyancy device.

4. The system of claim 2, wherein the PVC pipe comprises a buoyancy device attached to the pipe or within the pipe.

5. The system of claim 1, wherein the frame communicates with a component support that holds at least a working part of the system.

6. The system of claim 5, wherein the component support is perpendicularly integrated with a transducer column that holds the transducer and allows the transducer to have vertical movement lengthwise along the transducer column.

7. The system of claim 1, wherein the control unit is located outside the water medium.

8. The system of claim 1, wherein the control unit and the CPU board communicate via wireless Ethernet.

9. The system of claim 4, wherein the system comprises a power source that is held by a component support.

10. The system of claim 1, wherein the system comprises a transmitter board that generates signals to be transmitted and received by the transducer.

11. The system of claim 10, wherein the resonant frequency is of about 460 kHz.

12. The system of claim 1, wherein the transducer is a piezoelectric disk.

13. The system of claim 1, further comprising a receiver board to amplify and filter wave signals that are received by the transducer.

14. The system of claim 5, wherein the control unit is housed in a portable electronic device that communicates with the user via a wireless connection.

15. A method of determining the biomass of an underwater medium, comprising the steps of:

providing a floating assessment unit that comprises a frame, a transducer that emits and receives side scan sonar signals, a CPU board proximate to the frame and a control unit;

emitting a side scan sonar signal in an underwater medium;

receiving acoustic reflections of said sonar signal;

averaging the acoustic reflections to determine the acoustic background noise that is to be removed from the raw data during the processing step;

at least one of processing said reflection into a raw image, and/or processing said reflections to identify discrete echoes;

optionally processing said raw image into a processed image;

analyzing at least one of said processed image or discrete echoes in comparison with a standard to determine an amount of biomass in said underwater medium.

16. The method of claim 15, wherein said underwater medium is approximately one to two meters in depth.

17. The method of claim 15, wherein the surface area of the underwater medium is about one to ten acres.

18. The method of claim 15, wherein the transducer rotates 2 degrees after each wave emission to produce a 360 degree scan of a water medium by collecting 180 wave transmissions.

19. The method of claim 15, wherein the processing step comprises obtaining an average of the raw data to obtain a smoothed level, subtracting the smoothed level from the raw data to identify targets, and obtaining the relative amplitude and duration of the targets relative to the smoothed level.

20. The method of claim 15, wherein the analyzing step comprises comparing the discrete echoes to an empirical model to evaluate biomass in said medium.

* * * * *